United States Patent
Faisst et al.

(10) Patent No.: US 10,260,887 B2
(45) Date of Patent: Apr. 16, 2019

(54) POSITION DETERMINATION METHOD, ELECTRONIC CONTROL MODULE AND USE THEREOF

(71) Applicants: Continental Teves AG & Co. oHG, Frankfurt (DE); Continental Automotive GmbH, Hannover (DE)

(72) Inventors: Holger Faisst, Sinzing (DE); Michael Zalewski, Frankfurt am Main (DE); Ronald Winter, Mühlheim am Main (DE)

(73) Assignees: Continental Teves AG & Co. oHG, Frankfurt (DE); Continental Automotive GmbH, Hannover (DE)

( * ) Notice: Subject to any disclaimer, the term of this patent is extended or adjusted under 35 U.S.C. 154(b) by 76 days.

(21) Appl. No.: 15/485,693

(22) Filed: Apr. 12, 2017

(65) Prior Publication Data

US 2017/0356745 A1    Dec. 14, 2017

(30) Foreign Application Priority Data

Jun. 10, 2016    (DE) .................... 10 2016 210 352

(51) Int. Cl.
| | | |
|---|---|---|
| *G01C 21/28* | (2006.01) | |
| *B60R 21/013* | (2006.01) | |
| *G01S 19/42* | (2010.01) | |
| *B60R 21/0136* | (2006.01) | |
| *G01C 21/20* | (2006.01) | |
| *B60R 21/01* | (2006.01) | |
| *G01C 5/00* | (2006.01) | |

(52) U.S. Cl.
CPC ............ *G01C 21/28* (2013.01); *B60R 21/013* (2013.01); *B60R 21/0136* (2013.01); *G01C 21/20* (2013.01); *G01S 19/42* (2013.01); *B60R 2021/01286* (2013.01); *G01C 5/00* (2013.01)

(58) Field of Classification Search
CPC .......... G01C 21/28; G01C 21/20; G01C 5/00; B60R 21/0136; B60R 21/013; B60R 2021/01286; G01S 19/42
See application file for complete search history.

(56) References Cited

U.S. PATENT DOCUMENTS

| 5,210,540 A | 5/1993 | Masumoto |
| 5,748,075 A * | 5/1998 | Dirmeyer ............. B60R 16/037 |
| | | 180/274 |
| 6,249,246 B1 | 6/2001 | Bode et al. |

(Continued)

FOREIGN PATENT DOCUMENTS

| DE | 4219929 A1 | 12/1992 |
| DE | 19645394 A1 | 5/1998 |

(Continued)

OTHER PUBLICATIONS

German Search Report for German Application No. 10 2016 210 352.0, dated Jan. 13, 2017, including partial English translation, 9 pages.

*Primary Examiner* — Nadeem Odeh
*Assistant Examiner* — Michael V Kerrigan
(74) *Attorney, Agent, or Firm* — RatnerPrestia

(57) ABSTRACT

A position determination method in a vehicle, which uses signals from a pressure-based collision sensor. In addition, an associated electronic control module and an associated use.

15 Claims, 1 Drawing Sheet

(56) References Cited

U.S. PATENT DOCUMENTS

| | | |
|---|---|---|
| 6,792,352 B1 | 9/2004 | Hoffmann et al. |
| 2012/0265437 A1 | 10/2012 | Schaminee |
| 2015/0193996 A1* | 7/2015 | Van Wiemeersch ... G06Q 20/00 340/5.72 |
| 2017/0010174 A1* | 1/2017 | Melen .................. B62D 15/025 |

FOREIGN PATENT DOCUMENTS

| | | |
|---|---|---|
| DE | 19944177 A1 | 4/2001 |
| EP | 1527958 A1 | 5/2005 |

* cited by examiner

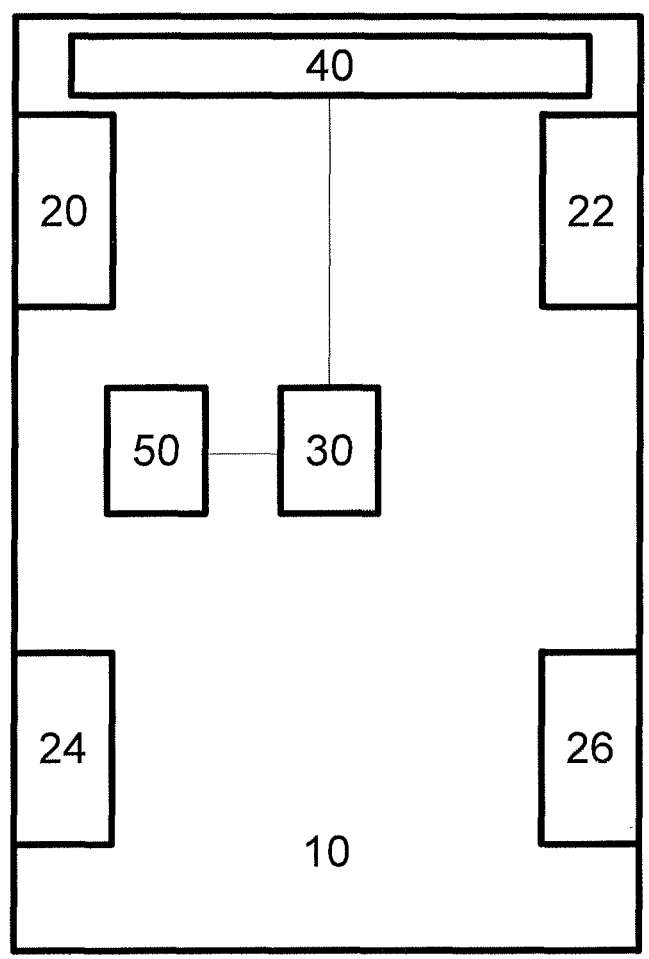

POSITION DETERMINATION METHOD, ELECTRONIC CONTROL MODULE AND USE THEREOF

CROSS REFERENCE TO RELATED APPLICATIONS

This application claims priority to German Patent Application No. 10 2016 210 352.0, filed Jun. 10, 2016, the contents of such application being incorporated by reference herein.

FIELD OF THE INVENTION

The invention relates to a position determination method in a vehicle as well as an electronic control module for carrying out such a method and an associated use.

BACKGROUND OF THE INVENTION

The process of determining the position of vehicles, in particular standard motor vehicles, by means of satellite navigation has been known for a long time. The accuracy which can be achieved in the process in terms of the position on the Earth's surface is now sufficient to provide the necessary data for most desired navigation purposes.

However, to date, the detection of the height of the vehicle has proven to be problematic. In this case, vertical positional inaccuracy can, for example, result in a false warning, if it is not recognized that the vehicle is located on a bridge over a road.

It is known that navigation systems, which are based on satellite navigation, can determine the height substantially less accurately than the horizontal position, which can in particular be expressed by, longitude and latitude. For example, the Galileo system has a horizontal positioning inaccuracy of 15 meters and a vertical positioning inaccuracy of 35 meters. Such positional inaccuracies are usually too large to be able to clearly assign a vehicle to a road if, for example, roads intersect bridges or tunnels.

Incorporated by reference, and DE 196 45 394 A1, which is incorporated by reference. However, this requires the additional installation of a barometric altimeter, which results in an increased outlay and higher costs.

SUMMARY OF THE INVENTION

It is therefore an aspect of the invention to provide a position determination method which can be carried out as an alternative to and, in particular with less outlay compared to, embodiments in accordance with the prior art. In addition, it is an object of the invention to provide an associated electronic control module as well as an associated use.

An aspect of the invention relates to a position determination method in a vehicle, comprising the following steps:
receiving a signal from a pressure-based collision sensor of the vehicle, and
establishing height information on the basis of the signal.

It has thereby been recognized within the framework of the invention that a separate barometric altimeter is not required to have air pressure-based height information available for position determination. Rather, collision sensors which can be used for this task are already installed in most vehicles. Such collision sensors are typically based on a volume which is pressurized or filled with a fluid, i.e. with a gas or a liquid, which is pressed in, in the event of a collision. A resulting change in pressure is detected by means of a pressure sensor. In the event that this pressure changes correspondingly quickly, it can be concluded that the vehicle has collided, for example with another vehicle, with a building or with a pedestrian.

Such collision sensors can now also be used to detect a change in air pressure, since a change in the air pressure also has an effect on the measured pressure, even if this takes place substantially more slowly than in the event of a collision. The slow change can be advantageously used to distinguish a collision from a height-related change in air pressure. If, for example, the vehicle is driving up an uphill gradient or down a downhill gradient, which frequently happens, for example, in city centers on entering tunnels, this can be simply recognized with the aid of the corresponding change in pressure. Such pressure changes take place over a considerably larger time scale than collisions, so that it is possible to distinguish between these without any problems.

A vehicle is, in particular, a standard motor vehicle which is operated on land. However, it can also be, for example, a watercraft or a muscle-powered vehicle as well. The use of the method in an aircraft is, in principle, also conceivable.

A side impact sensor and/or a pedestrian impact sensor is/are preferably used as the collision sensor(s). Side impact sensors are typically installed laterally in the vehicle, for example in side doors. Pedestrian impact sensors are typically installed in the front region, for example on the hood. Such sensors are typically configured in the manner described above and can therefore be preferably used for the purposes of the method according to the invention.

The height information is preferably a relative change in height. This makes it possible to detect vertical movements of the vehicle without a fixed reference point, which is easier to establish, as it is possible to dispense with a reference air pressure. Likewise it is, however, also possible to establish absolute height information, for example by using a reference air pressure. The reference air pressure can be obtained, for example, by using mobile data communication, for example from weather data.

The method preferably additionally comprises the following step:
determining a position of the vehicle.

This position can in particular include a position on the Earth's surface, i.e. longitude and latitude. It can be used for typical navigation purposes.

According to a preferred embodiment, the method additionally comprises the following step:
merging the position with the height information.

The position can therefore, for example, be enriched by the established height information for navigation purposes.

The method thereby preferably comprises the following step:
correcting or verifying a height as part of the position on the basis of the height information.

The height can, in this case, therefore be established, for example, both by means of satellite navigation and by means of barometric information, at least relatively in the latter case, and the corresponding information can be used in order to correct or verify the values. If, for example, the established changes in height point in different directions, this indicates a system error.

The position can be at least partially determined by means of satellite navigation. This corresponds to a simple and reliable method of determining the position.

The position can at least partially be determined by means of odometry. This makes it possible to determine the position on the basis of speed and course data or similar data of the vehicle.

The position can at least partially be determined by means of inertial sensors. In the process, actual accelerations can be detected and used.

The signal is preferably a raw signal, in particular without zero point correction. Such a raw signal can preferably be used for detecting pressure changes over a substantially longer time scale than in the event of collisions, since precisely such fluctuations are largely eliminated during the zero point correction which is otherwise used.

According to a preferred embodiment, the method is carried out in parallel with a plurality of signals. In this case, for example, signals from multiple collision sensors, for example from a pedestrian collision sensor and a side impact sensor or also multiple side impact sensors can be used, increasing the reliability when the method is carried out.

According to a preferred embodiment, the method additionally comprises the following steps:
 determining a temperature, and
 establishing the height information as well on the basis of the temperature.

This can therefore take account of the fact that the signals from standard collision sensors are temperature-dependent, so that temperature compensation can increase the reliability and accuracy.

According to a further development, the method additionally comprises the following step:
 determining a route of the vehicle and/or the risk of a collision on the basis of the height information. The risk of collision can, in this case, preferably also be established on the basis of height information of another vehicle. Such information can be exchanged, for example, by means of vehicle-to-X communication or other communication channels.

This further development makes it easy to recognize, for example in situations in which a vehicle is driving into a lower lying tunnel and another vehicle is passing through this tunnel at a somewhat higher level, that there is no risk of a collision. However, should the vehicles actually cross at the same level, the risk of a collision can be recognized. Such lower-lying tunnels occur in particular in city centers and can only be detected with difficulty with known navigation methods and, in particular, due to the fact that in such locations there is frequently only a restricted view up towards the sky, i.e. up towards satellites which provide position signals, because of the surrounding tall buildings.

In addition, an aspect of the invention relates to an electronic control module which is configured to carry out a method according to the invention. In addition, the invention relates to a non-volatile computer-readable storage medium on which program code is stored, during the execution of which a processor carries out a method according to the invention. In this case, it is possible to have recourse to all of the described embodiments and variants of the method.

In addition, an aspect of the invention relates to the use of a pressure-based collision sensor in order to establish height information of a vehicle. In particular, this can be effected in accordance with a method according to the invention. In the process, recourse can be had to all of the described embodiments and variants of the method.

In general, it should be mentioned that signals, in particular raw signals, can be obtained, for example from a pressure sensor such as a pressure satellite (pSAT), by means of which a change in air pressure can be determined. For example, this can be effected by means of the barometric height formula, by means of which a change in air pressure can be converted into a change in height. Alternatively, the change in air pressure can be determined by means of pressure sensors which are not fixed in the vehicle, which can therefore be installed, for example, in a smartphone or an electronic navigation device. These alternatives can also be linked.

The change in height signal can support the localization function in a sensor fusion with satellite navigation sensors, inertial sensors (IMU) and/or odometry sensors, for example as a measurement model in a Kalman filter, and thus provide the height information in a more accurate, more reliable and more secure manner as well as for longer and/or more quickly.

In particular, in the case of demanding satellite navigation (GNSS) conditions such as, for example, if the sky is largely concealed, i.e. in the event that few satellite signals can be received, the determination of position can be reduced to three (instead of the normal four) received GNSS satellites, in order to determine the horizontal position, while the vertical position is substantially supported by means of the change in pressure.

To this end, the height information can additionally or alternatively be supported, for example when using a tight coupling approach, by the barometric pressure sensor; alternatively, the system of equations of the GNSS calculation which has to be solved can be simplified in this regard by knowledge about the height component from the pressure sensor. It is not absolutely essential that four values are determined by means of more than four satellites (latitude, longitude, height and clock error) but, for example, just three values (latitude, longitude and clock error) would suffice, as a result of which three satellites would be enough for the calculation.

The present resolutions of 0.5 hPa per digit of typical collision sensors are sufficient for the procedure described here. In this case, the raw signal of the collision sensor is advantageously picked up, in order to analyze said raw signal. Since multiple collision sensors are, as a rule, installed in the vehicle, multiple signals can be redundantly used by collision sensors, in order to improve the safety and accuracy of the method. The height information from satellite information can be supported and/or filtered by means of a barometric sensor. A relative change in height can also be very easily detected, which is not typically possible by means of odometry and inertial sensor technology alone. It is also very easily possible to compare relative positions with each other in a certain environment, in order to recognize whether, for example, a broken down vehicle is at the same level and thus constitutes an obstacle, or whether it is located a few meters above the driver's own vehicle on a bridge and is therefore not critical. It is therefore very easily possible, even in the absence of an absolute height from the pressure sensor, to make a relative height statement, since the pressure conditions do not change so quickly within a limited period of time and location-related environment.

BRIEF DESCRIPTION OF THE DRAWINGS

The person skilled in the art will infer additional features and advantages from the embodiment example described below with reference to the attached drawing.

FIG. 1 shows a vehicle which is configured to carry out a method according to an aspect of the invention.

DETAILED DESCRIPTION OF THE PREFERRED EMBODIMENTS

FIG. 1 shows a vehicle 10. The vehicle 10 comprises four wheels 20, 22, 24, 26. It is understood that said FIGURE is merely a schematic representation.

In addition, the vehicle 10 comprises a control module 30 which is configured to carry out a method according to the invention. In this respect, this is a control module according to the invention.

The vehicle 10 additionally comprises a pedestrian collision sensor 40 which is installed as shown in the front region of the vehicle 10. Said pedestrian collision sensor 40 is constructed such that a pressurized volume is monitored by a pressure sensor, and this pressurized volume is installed along a section in the vehicle 10, with which a pedestrian would normally collide in the event of a frontal impact with the vehicle 10. The pedestrian collision sensor 40 can therefore conclude that a collision has occurred with a pedestrian in the event of a rapid change in pressure.

In addition, the vehicle 10 comprises a satellite navigation module 50. Said satellite navigation module is configured to determine a position having a horizontal as well as a vertical component on the basis of satellite navigation signals.

Both the pedestrian collision sensor 40 and the satellite navigation module 50 are connected to the electronic control module 30. The corresponding data are therefore constantly supplied to the electronic control module 30.

The electronic control module 30 can compare a height of the vehicle 10, which is recognized by the satellite navigation module 50, with a pressure change over typical time scales of a change in vehicle height, which is detected by the pedestrian collision sensor 40. Typically, a change in height recognized by the satellite navigation module 50 will be coarser than a corresponding change in pressure which is detected by the pedestrian collision sensor 40. In this case, a relative change in height of the vehicle 10 can be calculated on the basis of the data which are provided by the pedestrian collision sensor 40. This allows the electronic control module 30, for example, to detect whether the vehicle 10 is driving into a lower-lying tunnel or whether it has taken a turn, which leads to an uphill or downhill gradient section. It is not possible to make such detections solely in many situations with the data supplied by the satellite navigation module 50.

The risk of a collision with other vehicles can, in particular, be recognized by means of such provisions, for example when it depends on whether vehicles are located on the same level. Corresponding data can be exchanged with other vehicles by means of vehicle-to-X communication or other methods of communication.

Generally, it should be noted that vehicle to-X communication in particular denotes direct communication between vehicles and/or between vehicles and infrastructure installations. For example, this can therefore be vehicle-to-vehicle communication or vehicle-to-infrastructure communication. If, within the framework of this application, reference is made to communication between vehicles, this can, in principle, be effected, for example, within the framework of vehicle-to-vehicle communication, which is typically effected without switching by means of a mobile network or a similar external infrastructure and which therefore has to be delimited from other solutions which build, for example, on a mobile network. Vehicle-to-X communication can be effected, for example, using the standards IEEE 802.11p or IEEE 1609.4. Vehicle to-X communication can also be referred to as C2X communication. The subareas can be referred to as C2C (car-to-car) or C2I (car-to-infrastructure). However, the invention does not explicitly exclude vehicle-to-X communication with switching, for example, via a mobile network.

The indicated steps of the method according to the invention can be carried out in the sequence indicated. However, they can also be carried out in a different sequence. The method according to the invention can be carried out in one of its embodiments, for example with a specific set of steps, such that no additional steps are carried out. However, additional steps can in principle also be carried out, including those which are not mentioned.

The claims associated with the application do not constitute a \waiver of the attainment of more extensive protection.

If it emerges, during the course of the method, that a feature or a group of features is not absolutely necessary, a formulation of at least one independent claim is already striven for by the applicant now, which no longer comprises the feature or group of features. This can, for example, be a sub-combination of a claim which exists on the date of filing or a sub-combination of a feature which exists on the date of filing, which is restricted by additional features. Such claims or combinations of features, which are to be newly formulated, are to be deemed to also be covered by the disclosure of this application.

It is additionally pointed out that configurations, features and variants of the invention, which are described in the various embodiments or embodiment examples and/or which are shown in the FIGURES, can be combined with one another at will. Individual or multiple features can be freely interchanged. Resulting combinations of features are also to be understood to be covered by the disclosure of this application as well.

References in dependent claims are not to be understood to be a waiver of the attainment of independent protection of the subject matter for the features of the subordinate claims which refer back to the principal claims. These features can also be combined with other features at will.

Features which are merely disclosed in the description, or features which are only disclosed in the description or in a claim in conjunction with other features, can in principle be independently essential to the invention. They can therefore also be individually included in claims in order to demarcate the invention from the prior art.

The invention claimed is:

1. A method for determining a corrected altitude for a vehicle comprising:
   receiving altitude information from a satellite navigation system of the vehicle; receiving a signal from one or more pressure-based collision sensors of the vehicle, the signal corresponding to a change in altitude of the vehicle over a period of time; and
   determining a corrected altitude of the vehicle based on the altitude information and the signal.

2. The method according to claim 1, wherein the one or more pressured-based collision sensors comprise at least one of a side impact sensor and a pedestrian impact sensor.

3. The method according to claim 2, wherein the altitude information is a relative change in altitude over the period of time.

4. The method according to claim 1, wherein the altitude information is a relative change in altitude over the period of time.

5. The method according to claim 1, additionally comprising: determining a position of the vehicle.

6. The method according to claim 5, additionally comprising: merging the position with the corrected altitude of the vehicle.

7. The method according to claim 5, wherein the position is at least partially determined by the satellite navigation system of the vehicle.

8. The method according to claim 5, wherein the position is at least partially determined by odometry of the vehicle.

9. The method according to claim 5, wherein the position is at least partially determined by inertial sensors of the vehicle.

10. The method according to claim 1, wherein the signal is a raw signal, without zero point correction.

11. The method according to claim 1, wherein the one or more pressure-based collision sensors comprises a plurality of pressure-based signal sensors, the method further comprising: determining the corrected altitude based on a plurality of signals from the plurality of pressure-based collision sensors.

12. The method according to claim 1, additionally comprising: determining a temperature, and determining the corrected altitude of the vehicle further on the basis of the temperature.

13. The method according to claim 1, additionally comprising: determining at least one of a route of the vehicle and a risk of a collision on the basis of the corrected altitude of the vehicle, wherein the risk of the collision is further established on the basis of the altitude information of another vehicle.

14. A non-volatile computer-readable storage medium on which program code is stored, the execution of said program code causing a processor of a vehicle to carry out the method according to claim 1.

15. A processor of a vehicle which is configured to carry out a method according to claim 1.

* * * * *